US012630271B2

(12) United States Patent
Clark et al.

(10) Patent No.: US 12,630,271 B2
(45) Date of Patent: May 19, 2026

(54) SYSTEM AND METHOD FOR DYNAMIC NAVIGATION ROUTING FOR INSHORE AND NEARSHORE COASTAL AREAS

(71) Applicants: Taylor Clark, Dahlonega, GA (US); Thomas J. Schultz, Cushing, MN (US); Brian Laser, Suwanee, GA (US); Adam Iles, Mississauga (CA)

(72) Inventors: Taylor Clark, Dahlonega, GA (US); Thomas J. Schultz, Cushing, MN (US); Brian Laser, Suwanee, GA (US); Adam Iles, Mississauga (CA)

(73) Assignee: Johnson Outdoors Inc., Racine, WI (US)

( * ) Notice: Subject to any disclaimer, the term of this patent is extended or adjusted under 35 U.S.C. 154(b) by 152 days.

(21) Appl. No.: 18/883,667

(22) Filed: Sep. 12, 2024

(65) Prior Publication Data

US 2026/0070635 A1     Mar. 12, 2026

(51) Int. Cl.
B63B 49/00          (2006.01)
G01S 15/89          (2006.01)

(52) U.S. Cl.
CPC .............. B63B 49/00 (2013.01); G01S 15/89 (2013.01); B63B 2213/02 (2013.01)

(58) Field of Classification Search
CPC ...... B63B 49/00; B63B 2213/02; G01S 15/89
See application file for complete search history.

(56) References Cited

U.S. PATENT DOCUMENTS

| | | | |
|---|---|---|---|
| 7,268,703 B1 | 9/2007 | Kabel et al. | |
| 2018/0129213 A1* | 5/2018 | Pelin | G05D 1/0206 |

(Continued)

FOREIGN PATENT DOCUMENTS

| | | |
|---|---|---|
| CN | 113155106 A | 7/2021 |
| EP | 3 885 705 A1 | 9/2021 |

(Continued)

OTHER PUBLICATIONS

U.S. Department of Commerce National Oceanic and Atmospheric Administration National Ocean Service Center for Operational Oceanographic Products and Services; Tidal Datums and Their Applications; NOAA Special Publication NOS CO-OPS 1; Jun. 2000.

(Continued)

*Primary Examiner* — Angela Y Ortiz
*Assistant Examiner* — Jeffrey R Chalhoub
(74) *Attorney, Agent, or Firm* — Reinhart Boerner Van Deuren P.C.

(57)          ABSTRACT

A system and method of providing navigational routing paths through inshore and nearshore coastal areas that include surveyed depth information and visual indications of the suitability of such paths based on particulars of the user's boat and preferences are presented. Adjustments to both an indication of the depth and the suitability of each segment of the paths are provided. Manual input of local water level observations or tide data from local tide stations may be used for such adjustments. Adjustments may be applied locally or globally, and may be provided dynamically based on changing tide information over the travel time needed to reach distant segments along the navigational routing path. Such tide information is also used to adjust contour and depth area data displayed on bathymetric contour maps on which such navigational routing paths are displayed.

14 Claims, 7 Drawing Sheets

(56) References Cited

U.S. PATENT DOCUMENTS

| 2022/0268585 A1 * | 8/2022 | Tulgara | G01C 21/203 |
| 2025/0382039 A1 | 12/2025 | Armstrong | |

FOREIGN PATENT DOCUMENTS

| EP | 2 650 645 B1 | 3/2022 | |
| GB | 2474715 A | 4/2011 | |
| GB | 2500325 A | 9/2013 | |
| GB | 2505121 A * | 2/2014 | B63B 49/00 |
| JP | 2011225208 A | 11/2011 | |

OTHER PUBLICATIONS

U.S. Department of Commerce National Oceanic and Atmospheric Administration National Ocean Service Center for Operational Oceanographic Products and Services; Computational Techniques for Tidal Datums Handbook; NOAA Special Publication NOS CO-OPS 2; Sep. 2003.

U.S. Department of Commerce National Oceanic and Atmospheric Administration National Ocean Service Center for Operational Oceanographic Products and Services; Tide and Current Glossary; Jan. 2000.

Tidal Datums; https://tidesandcurrents.noaa.gov/datum_options. html; known prior to Sep. 12, 2024.

https://floridamarinetracks.com/?srsltid=AfmBOoreryykLNrJcGzl4_ SLjW9AK_ysKYW5mNqg4qaesFP16p9nR_7E; known prior to Sep. 12, 2024.

https://www.garmin.com/en-US/c/marine-cartography/bluechart-g3/; known prior to Sep. 12, 2024.

https://www.garmin.com/en-US/garmin-technology/marine-technology/ charts-and-maps/auto-guidance-routing/; known prior to Sep. 12, 2024.

* cited by examiner

300

700          702          704

300

700          702'          704'

SYSTEM AND METHOD FOR DYNAMIC NAVIGATION ROUTING FOR INSHORE AND NEARSHORE COASTAL AREAS

FIELD OF THE INVENTION

This invention generally relates to inshore and nearshore coastal navigation for recreational watercraft, and more particularly to systems and methods for providing suggested navigational routing paths through such inshore and nearshore coastal areas.

BACKGROUND OF THE INVENTION

Navigating inshore and nearshore coastal areas can be difficult, especially for the less experienced boater. Several factors can contribute to whether an area is navigable, including the vessel's draft, tide conditions, wind and weather conditions, and local hazards. Captains spend years accumulating the local knowledge to traverse their treacherous hazards, shallow sandbars, and oyster beds, that often are not illustrated on available charts and maps, or that may only become hazards during certain tidal conditions.

To address such problem and aid boaters operating in these waters, mapping companies have developed GPS-based marine navigation routing systems that can calculate a route from the boat's current location to a desired user-set waypoint. Such systems typically include numerous settings that may be selected and adjusted by the boater to be used by the system to calculate a route.

Unfortunately, absent selection or adjustment of these numerous settings by the boater, a route calculated by such a GPS-based system may include portions that go over land or other areas that are not traversable by a boat. While such portions may be highlighted on the route calculated and displayed to the boater, unless the boater realizes that the system has just calculated and displayed a route that cannot be completed on the boat, the boater may inadvertently follow the route to a shoreline that prevents further advancement to the desired waypoint.

Further, even if the boater realizes that the calculated and displayed route cannot be followed in their boat before starting out, the boater must then determine what setting or settings need to be adjusted to avoid such areas, adjust or set same, and then request the calculation of a new route. That newly calculate route must then again be scrutinized to ensure that the route can actually be followed, and if not, the selection, adjustment, and recalculation process must again be done until the GPS-based system calculates an acceptable route.

Recognizing the limitations of and the frustration caused by such GPS-based marine routing systems, other mapping companies have developed charts using local knowledge for such inshore and nearshore coastal areas that contain various types of navigation tracks. These navigation tracks typically include a description of the operating conditions that must be present for a boater to follow such track. For example, tracks may be presented in different colors that signify the different operating conditions necessary for such colored track. Such necessary operating conditions for one colored track may be defined by the draft of a boat and the minimum safe operating depth necessary for the boat for one type of track. For a different colored track, the necessary operating conditions may simply specify that they should only be followed during high water conditions during periods of good visibility.

The reason that such more limited operating condition tracks are presented is that they typically provide many short cuts that have been discovered by local captains over the years. Such short cuts provided by tracks of this type often can only be used during high water conditions but may save substantial time and distance from one location to another compared to tracks that can be run regardless of the tidal condition. Some short cuts provided by these tracks may not exist during low water conditions and may only allow use of particular types of boats, e.g., airboats, during high water conditions.

The inclusion and designation of the type of track on such charts is often done at the discretion of the individual cartographer creating the track. As such, some tracks also include various caution or warning icons, e.g., of different shapes and colors, on the tracks. These icons indicate different hazards on or along more difficult sections of such tracks. Often such icons are used to identify the entrance to a particularly narrow channel, a narrow cut through a bank or flat, etc. Indeed, such icons generally indicate any area along a track that requires the use of extra caution and may require the boat's motor to be trimmed, particularly at lower tides. Because of the personal discretion used in the decision to include some tracks, some icons or warnings may specify that the track should only be used by more experienced boaters who have prior experience in the area.

Unfortunately, because such warning icons are placed at the discretion of the creator of the track, and because they do not provide actual data that the boater can use to assess the applicability of such warning, such icons often create confusion regarding the ability of a user to navigate a particular track.

What is needed, therefore, is a system that provides a chart with navigational routing paths and the conditions of those navigational routing paths in changing tide conditions to enable navigating inshore and nearshore coastal areas without having to determine whether discretionary warnings apply to the boat's captain. Embodiments of the present invention provide such a dynamic navigation routing system for such inshore and nearshore coastal areas. These and other advantages of the invention, as well as additional inventive features, will be apparent from the description of the invention provided herein.

BRIEF SUMMARY OF THE INVENTION

In view of the foregoing, embodiments of the present invention provide a new and improved system to provide navigation charts having navigational routing paths for inshore and nearshore coastal areas. More particularly, embodiments of the present invention provide a new and improved system to provide navigation charts having navigational routing paths that include the conditions of those navigational routing paths in changing tide conditions to enable navigating inshore and nearshore coastal areas. Still more particularly, such recommended navigational routing paths through inshore and nearshore coastal areas are provided to indicate the actual conditions of the navigational routing paths themselves in changing tide conditions, which provide a valuable tool for the less experienced boater, or one unfamiliar with a new area.

In one embodiment, the system provides predetermined lines that overlay a bathymetric map to aid the boater in finding possible efficient routes through inshore and nearshore coastal areas. Such navigational routing paths are provided so that the boater can select from among several possible routes through the inshore and nearshore coastal areas to their destination. The provision of such multiple available routes provides peace of mind to the boater who does not have years of experience in a given area.

In a preferred embodiment, the system not only provides recommended navigational routing paths that may be used to navigate inshore and nearshore coastal areas, but also provides vital information to the user on whether that track is navigable for that particular boater when taking into account the vessel's draft and tide conditions. More preferably, such vital information is provided on each leg and segments of the navigational routing paths to allow selection thereof in real time as navigation decision are being made. The system does not require further input from the boater and a request to recalculate a route in order to provide various options for navigation.

In an embodiment, the navigational routing paths have been physically recorded by survey boats to aid in navigation for the inshore and nearshore coastal areas, as opposed to mere computer-generated routes calculated between two GPS points. Indeed, the navigational routing paths'existence is not dependent on whether a boater needs to traverse the inshore and nearshore coastal area, and therefore, they may be toggled on/off by the boater.

In embodiments of the present invention, depth labels are overlayed on the navigational routing paths. These depths were recorded by survey boats and are adjusted to Mean Lower Low Water (MLLW), Lowest Astronomical Tide (LAT), Lowest Observed Tide (MIN TIDE), or other tidal datums. In general, a datum is a base elevation used as a reference from which to reckon heights or depths. A tidal datum is a standard elevation defined by a certain phase of the tide. Tidal datums are used as references to measure local water levels and should not be extended into areas having differing oceanographic characteristics without substantiating measurements. In order that they may be recovered when needed, such datums are referenced to fixed points known as bench marks. Tidal datums are also the basis for establishing privately owned land, state owned land, territorial sea, exclusive economic zone, and high seas boundaries.

Definitions of tidal datums are maintained by the Center for Operational Oceanographic Products and Services. The MLLW is the average of the lower low water height of each tidal day observed over the National Tidal Datum Epoch. The LAT is the elevation of the lowest predicted astronomical tide expected to occur at a specific tide station over the time period of 40 years. The 40 years period will include two National Tidal Datum Epoch periods. This time period will be updated every 20 years. The present values are based on the time period of 2000-2040. The MIN TIDE is the minimum height reached by a falling tide. The low water is due to the periodic tidal forces and the effects of meteorological, hydrologic, and/or oceanographic conditions. Such depth labels can be toggled on or off by the user in certain embodiments.

In embodiments of the present invention, the color or visual presentation of the navigational routing paths displayed on the head unit and overlaid on the navigation map is dependent on the user's defined safe depth setting based on the boat's draft. While the particular colors or visual presentation may be selected or adjusted by the user to suit their preferences, navigational routing path segments at or deeper than the safe depth setting are displayed in a common color, e.g., yellow, or other visual presentation style, e.g., an open track without crosshatching, etc. Navigational routing path segments that are shallower than the safe depth setting are displayed in a different common color, e.g., red, or a different visual presentation style, e.g., a track with crosshatching, stippling, etc. and can also be set by the user based on their preferences. Further, because of the dynamic water levels of the inshore and nearshore coastal areas, there may also be navigational routing path segments that, when the data is adjusted to MLLW, LAT, MIN TIDE, or other tidal datums, the depths become positive, i.e., above water, or drying. These segments are indicated in certain embodiments by a different line style and/or color. The depth labels for such positive depths are also indicated differently in certain embodiments.

Because the inshore and nearshore coastal areas are affected by tides, the navigational routing path depth labels and colors or visual presentation thereof are also adjusted to accommodate the changing depths throughout the day and due to current conditions. Such adjustments may be based on a manual change to a water level offset setting, which can be used to display navigational routing path depths more accurately according to manually observed tidal conditions. In certain embodiments of the present invention, the system can use tidal data from nearby tide stations when available to automatically adjust the depth labels and segment colors or visual presentation of the navigational routing paths.

In certain embodiments of the present invention, the system allows the user to select a desired destination to which the user wants to go from the current position of the boat, or both a starting point (other than the current position of the boat) and finish point on the navigation map. The system will then highlight a suggested route using the preexisting navigational routing paths to reach the destination from the starting point. Such routing via the navigational routing paths may be based on the shortest time, distance, widest margin of safety based on depth, etc. as selected by the user and taking into account the user's safe depth, or boat draft, setting. In an embodiment the system will adjust the suggested navigational routing paths or segments thereof based on the tidal data or water level offset input while traversing the route or based on a time of getting underway.

That is, the system may generate a suggested route from among the navigational routing paths when requested by the user during high tide, but if the boat does not get underway until later in the day approaching low tide, the system will automatically adjust the suggested navigational routing paths to account for same. In a similar manner, a dynamic adjustment of the navigational routing paths used in the route in certain embodiments will accommodate for travel time along the route based on speed and tidal activity over such period.

In one embodiment a computer-implemented method for dynamically adjusting navigational routing paths through an inshore and nearshore coastal area within a navigation display in a graphical user interface is provided. The method includes the steps of: displaying a first window containing a marine navigational map within the graphical user interface on a fish finder; displaying a navigational routing path overlaid on the first window containing the marine navigational map within the graphical user interface on the fish finder. The navigational routing path includes a plurality of segments embedded with depth data for each of the plurality of segments, and the depth data is adjusted to MLLW, LAT, MIN TIDE, or other tidal datums. The method also includes the steps of: receiving tide data, by a processor, for the inshore and nearshore coastal area displayed in the first window; automatically generating a display depth, by a processor, for each of the plurality of segments based on an adjustment to the depth data in view of the tide data; and displaying the display depth overlaid on each respective plurality of segments of the navigational routing path on the first window containing the marine navigational map within the graphical user interface on the fish finder to correspond to a current depth of the segment.

In an embodiment the method also includes the steps of receiving boat draft information and determining a safe depth, by a processor, based on the boat draft information. The step of displaying the navigational routing path in this embodiment also includes the steps of displaying each segment that has an associated display depth greater than or equal to the safe depth in a first line style, and displaying each segment that has an associated display depth less than the safe depth in a second line style visually different than the first line style. In a further embodiment, the step of displaying the navigational routing path includes the step of displaying each segment that has an associated display depth that is negative in a third line style that is visually different than the first line style and the second line style.

In an embodiment the step of receiving tide data, by the processor, for the inshore and nearshore coastal area displayed in the first window includes the steps of: displaying a second window overlapping the first window within the graphical user interface on a fish finder, the second window containing a navigation setting user interface; receiving a water level offset, by the processor, from the navigation setting user interface of the second window overlapping the first window within the graphical user interface on a fish finder; and using the water level offset as the tide data in the step of automatically generating the display depth by the processor. In certain embodiments the step of receiving tide data, by the processor, for the inshore and nearshore coastal area displayed in the first window includes the step of receiving tide data, by the processor, for the inshore and nearshore coastal area displayed in the first window transmitted by a tide station.

In some embodiments the step of receiving tide data, by the processor, for the inshore and nearshore coastal area displayed in the first window includes the steps of: receiving high/low information, by the processor, for the inshore and nearshore coastal area displayed in the first window transmitted by a secondary tide station; determining a present time and location, by the processor, from a global positioning system (GPS) signal; interpolating a current water height, by the processor, based on the present time and location from the GPS signal and on the high/low information transmitted by the secondary tide station using a sine wave calculation from the National Oceanographic and Atmospheric Administration (NOAA); and using the current water height as the tide data in the step of automatically generating the display depth by the processor.

In an embodiment, a computer-implemented method for generating dynamically adjustable navigational routing paths through an inshore and nearshore coastal area to be displayed within a navigation display in a graphical user interface is provided. The method includes the steps of: recording time and location information from a Global Positioning System (GPS) signal while surveying a navigational routing path through the inshore and nearshore coastal area displayed within a navigation display in a graphical user interface of a fish finder; recording depth information from a sonar depth sounder while surveying the navigational routing path through the inshore and nearshore coastal area displayed within a navigation display in a graphical user interface of a fish finder; recording tide data while surveying the navigational routing path through the inshore and near-shore coastal area displayed within a navigation display in a graphical user interface of a fish finder; correlating the location information with the depth information, by a processor, to generate segments of the navigational routing paths having depth information associated therewith; correlating the time information with the tide information, by a processor, to generate a local tide influence factor; adjusting the depth information associated with each of the segments, by a processor, based on the local tide influence factor to generate a Mean Lower Low Water (MLLW), a Lowest Astronomical Tide (LAT), a Lowest Observed Tide (MIN TIDE), or other tidal datum adjusted depth; and storing the navigational routing paths, by a processor in a non-transitory fish finder computer readable media, having segments with the MLLW, LAT, MIN TIDE, or other tidal datum, adjusted depth associated therewith.

In an embodiment the method also includes the steps of displaying the navigational routing paths having segments with the MLLW, LAT, MIN TIDE, or other tidal datums adjusted depth associated therewith through the inshore and nearshore coastal area displayed within the navigation display in the graphical user interface of the fish finder, by the processor, overlaid on the navigation display. Certain embodiments also include the steps of: receiving current local tide information; dynamically adjusting, by a processor, the MLLW, LAT, MIN TIDE, or other tidal datums adjusted depth associated with each of the segments based on the current local tide information to provide current depth information for each segment; and displaying the current depth information of each of the segments of the navigational routing paths, by a processor, on the navigation display in the graphical user interface of the fish finder.

Some embodiments also include the steps of: receiving boat draft information; and determining a safe depth, by the processor, based on the boat draft information. Further, the step of displaying the navigational routing path in such embodiments includes the steps of: displaying each segment that has an associated current depth information greater than or equal to the safe depth in a first line style; and displaying each segment that has an associated current depth information less than the safe depth in a second line style visually different than the first line style. In other embodiments the step of displaying the navigational routing path includes displaying each segment that has an associated current depth information that is negative in a third line style that is visually different than the first line style and the second line style.

In certain embodiments the step of receiving current local tide information includes the steps of displaying a window within the graphical user interface on the fish finder, the window containing a navigation setting user interface, receiving a water level offset, by the processor, from the navigation setting user interface of the window within the graphical user interface on the fish finder and using the water level offset as the current local tide information in the step of dynamically adjusting the MLLW, LAT, MIN TIDE, or other tidal datums adjusted depth associated with each of the segments based on the current local tide information to provide current depth information for each segment.

In some embodiments the step of receiving current local tide information includes the step of receiving current local tide information transmitted by a tide station. In other embodiments the step of receiving current local tide information includes the steps of: receiving high/low information, by the processor, for the inshore and nearshore coastal area transmitted by a secondary tide station; determining a present time and location, by the processor, from a global positioning system (GPS) signal; interpolating a current water height, by the processor, based on the present time and location from the GPS signal and on the high/low information transmitted by the secondary tide station using a sine wave calculation from the National Oceanographic and Atmospheric Administration (NOAA); and using the current water height as the current local tide information in the step of dynamically adjusting the MLLW, LAT, MIN TIDE, or other tidal datums adjusted depth associated with each of the segments based on the current local tide information to provide current depth information for each segment.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, there are illustrated various embodiments of the present invention along with illustrations detailing various beneficial features provided thereby. However, as will become clear to those skilled in the art, the inshore and nearshore coastal areas utilized in such illustrations are merely exemplary environments that the following description uses to discuss the various embodiments and features of the present invention. Navigation through other inshore and nearshore coastal areas, as well as other marine environments, than those illustrated is also aided by embodiments of the present invention, and therefore the illustrated embodiments and the discussion of same should be taken by way of example and not by way of limitation.

Figure 1:
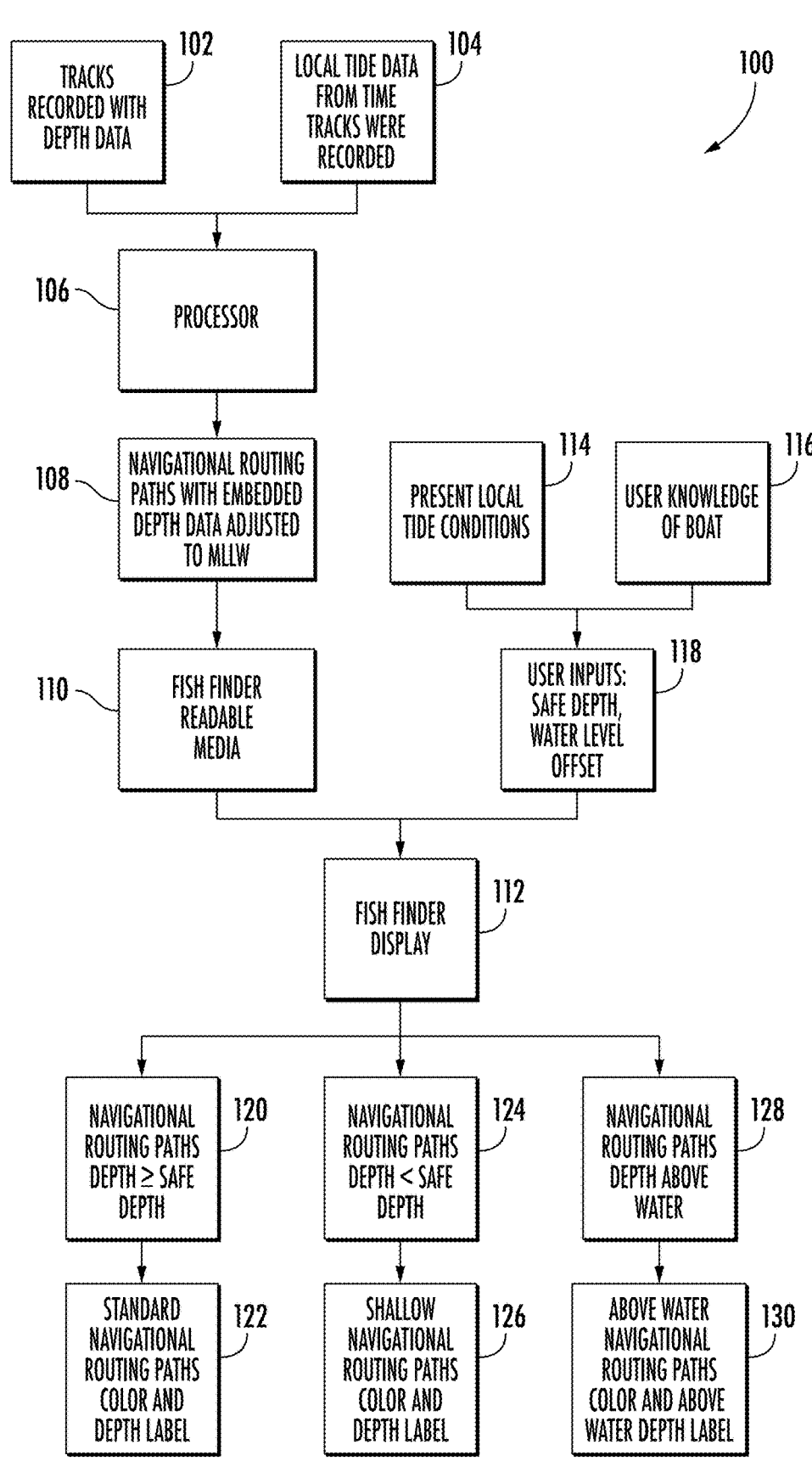
FIG. 1 is a navigational routing path development flow chart for an embodiment of the system of the present invention utilizing a user manual input.

With reference to the flow diagram of FIG. 1, an embodiment of a method 100 of creating and manually adjusting the navigational routing paths for the inshore and nearshore coastal areas is illustrated. The navigational routing paths are recorded at step 102 by navigating physical boats on the water that utilize GPS-enabled sonar marine electronics, e.g., Humminbird® sonar systems, to collect track, location, depth, navigational aids, and timestamp for everywhere the boat travels. Due to varying tides throughout the day, tide data input at step 104 from when the navigational routing paths were recorded is correlated at step 106 by a processor.

If required due to the time of collection of the depth information, the tide data is then used at step 108 to adjust the depth data from the level it was recorded in step 102 to the Mean Lower Low Water (MLLW), the Lowest Astronomical Tide (LAT), the Lowest Observed Tide (MIN TIDE), or other tidal datums. In one embodiment, the navigational routing paths are created on board the survey vessel, while in other embodiments the data is uploaded from the field to a remote server for post processing of tidal corrections.

For the United States inshore and nearshore coastal areas, the National Oceanographic and Atmospheric Administration (NOAA) provides three types of major tidal stations. The first are water level stations, which have an active water level gauge that takes readings every 1 or 6 minutes. These gauges take readings in real time and can account for wind and storm influences to tides that other predictive stations cannot. The second type are harmonic stations. These are predictive stations which provide tide height predictions in 1-, 6-, 15-, and 30-minute intervals, 1-hour intervals, or high/low. The third type are secondary stations. These secondary stations are also predictive in nature and provide only a low/high prediction.

Regardless of the location of the inshore and nearshore coastal areas for which navigational routing paths are developed, utilizing time stamps that are included in the GPS and bathymetry data collection recorded in step 102, each point location of the boat can be correlated to tide data from the nearest or best suited tidal station at step 104 to predict its height above MLLW, LAT, MIN TIDE, or other tidal datums for use by the processor step 106 in the adjustment for step 108. When using stations that do not have 1-minute intervals, such as, e.g., secondary stations that provide only high/low information, an embodiment of the present method interpolates the height using the same sine wave calculation NOAA uses between its high and low tide. This interpolation generates depth values in 1-second intervals that correlate with the predictive sine curve NOAA provides.

The newly created predictive depth values with 1-second intervals between NOAA's provided high and low tide values are then then applied to the corresponding time stamps from the GPS/sonar data file. This process provides the correlated tidal height between the high and low that then may be applied to the level and time of the recorded depth based on the corresponding time stamps from the GPS/sonar data file at step 108.

The resulting adjusted point-by-point data is then used to generate a line that forms the basis of the navigational routing path. While segment lengths of that line can be selected as desired, for most inshore and nearshore coastal vessels, line segments of approximately 50-feet are used. For each segment of the line, the shallowest of the point depths used in constructing that segment is applied for the depth reading displayed for that segment. The depth values are rounded down or truncated to whole numbers to make them easy to read and understand on a fish finder or navigation unit display.

The depth data is reviewed manually by eye and/or via an automated processes to look for obvious anomalies where the sonar may have misread the bottom depth. If such anomalous data is found, it is then removed. Anomalies may be caused by air bubbles in the water column, debris, large schools of baitfish, or a variety of other issues. In some embodiments, the navigational routing paths can be edited manually based on a review with aerial imagery, e.g., if a better path is identified.

Once the creation of the navigational routing paths is complete, the line data with depth segments embedded may be converted from the Geographic Information System (GIS) standard format of shapefile (.shp) into various proprietary formats used by the control head units of various manufacturers' fish finders, such as the format which is displayed by the Humminbird® control heads. This information is then stored on appropriate fish finder readable media, on board or removeable, at step 110, which is then used to display the navigational routing paths on the fish finder display at step 112.

Figure 3:
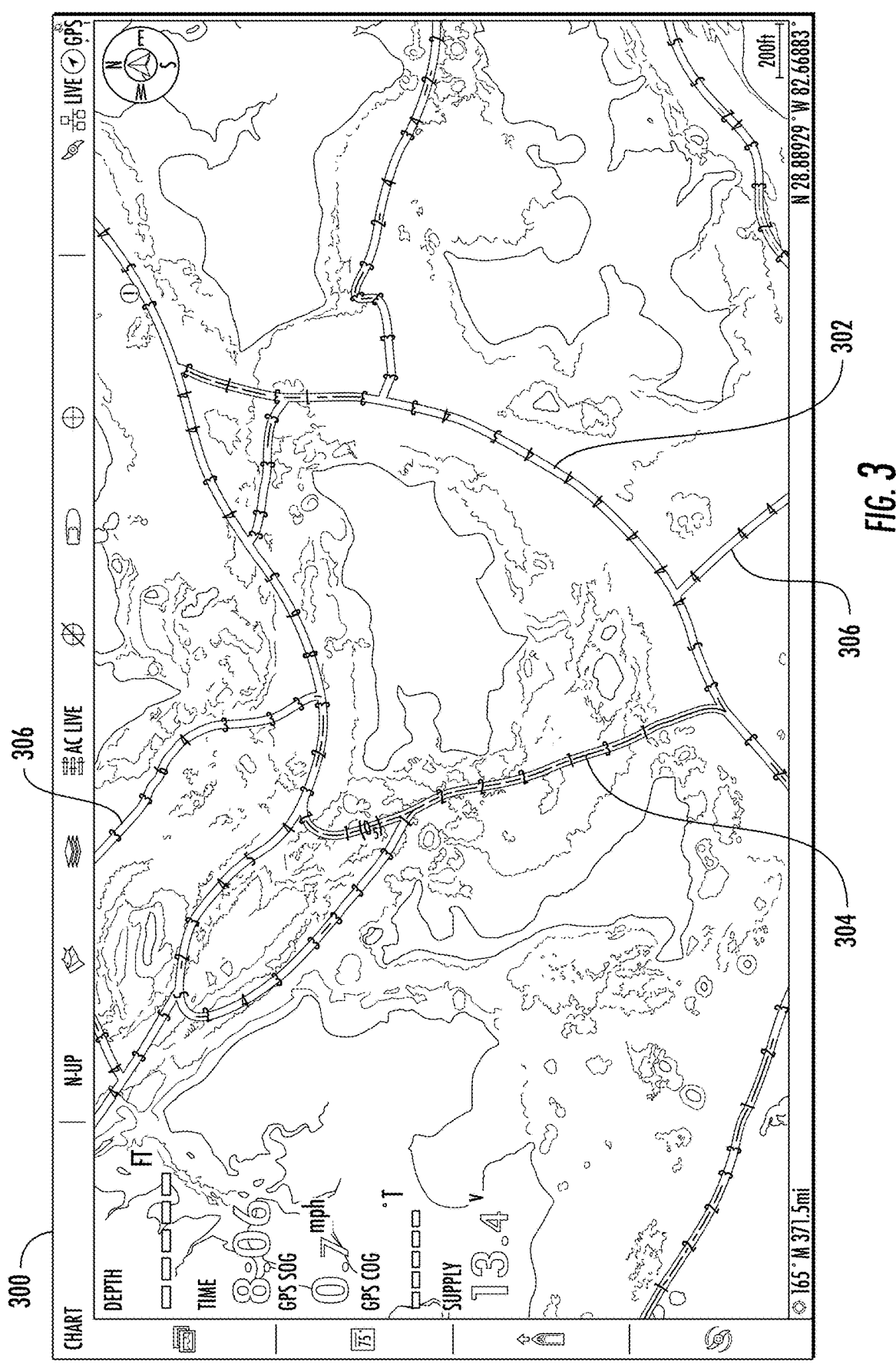
FIG. 3 is a visual representation of navigational routing paths generated by an embodiment of the system of the present invention overlaid on an aerial image marine navigation map on a control head display.

An exemplary display 300 of a fish finder control head showing the navigational routing paths 302 overlaid on an aerial navigation map may be seen in FIG. 3. As illustrated, each segment of the navigational routing paths 302 is presented in a visual presentation style 304, e.g. color, line type, hatching, etc, the selection of which will be discussed more fully below. Also displayed on each segment of the navigational routing paths is the depth value 306 discussed above.

Returning to the embodiment illustrated in FIG. 1, the user is able to input various pieces of information that allow customization and increase the fidelity of the navigational routing paths displayed at step 112. As shown at step 114, the user is able to input the present local tide conditions observed by the boater for use by the system to adjust the display of the navigational routing paths and the depth information for each segment, globally or only locally as desired. For example, in an embodiment where only the local segments are adjusted, the depths of the navigational routing path segments in proximity to the observed tidal condition location are adjusted, while more distant segments of the navigational routing paths that are in closer proximity to a tide station providing tide information are not.

The user is also able to input information reflecting the user's knowledge of their boat at step 116 that may also be used to adjust how the navigational routing paths are displayed. Such information typically includes the draft of the boat. Additionally, certain types of boats may be prohibited from entering certain areas through which a navigational routing path is normally displayed. If at step 116 the user's boat is identified as one of the prohibited types, the system will not display that navigational routing path, or will display it using a track type or color that signifies the unavailability of that track to the user.

The information entered at both steps 114 and 116 is used to determine a default safe depth and water level offset at step 118 for the navigational routing paths. In certain embodiments, as will be discussed more fully below, the user is also able to adjust the safe depth and the water level offset at step 118 manually.

Figure 4:
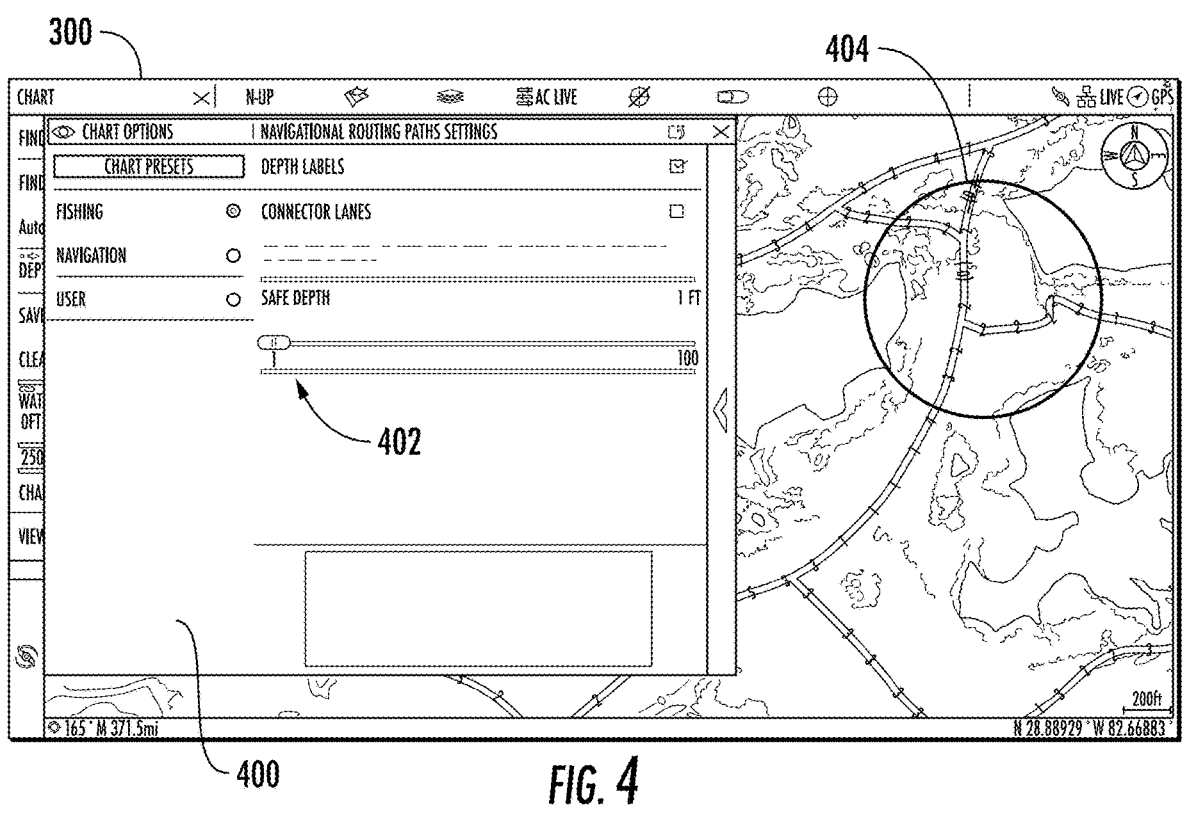
FIG. 4 is a visual representation of a user input window generated by an embodiment of the system of the present invention allowing for user input of a safe operating depth overlaid on an aerial image navigation map having navigational routing paths displayed thereon for a given setting for safe depth.
Figure 5:
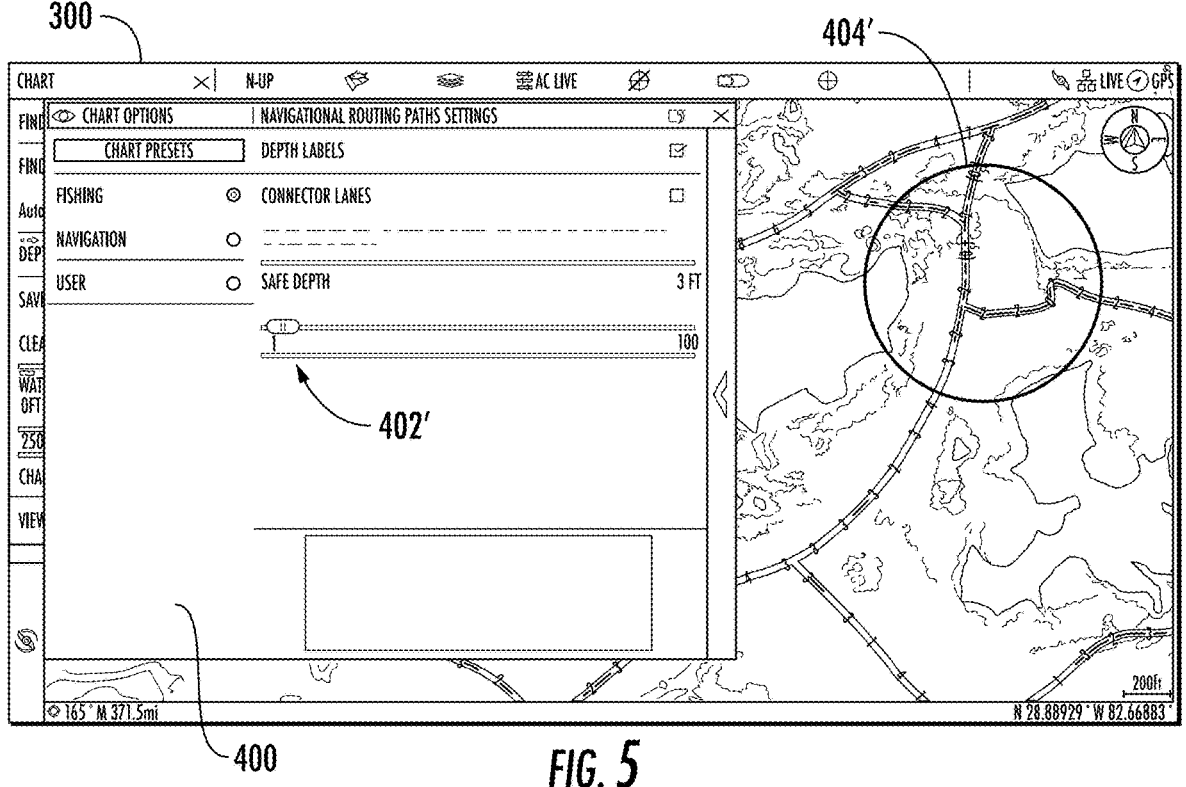
FIG. 5 is a visual representation of a user input window generated by an embodiment of the system of the present invention allowing for user input of a safe operating depth overlaid on an aerial image navigation map having navigational routing paths displayed thereon illustrating a change in visual display of the navigational routing paths resulting from a change in the user input for safe depth.

FIGS. 4 and 5 illustrate this capability and the effect on the segments of the navigational routing paths. Specifically, an options menu 400 may be opened on the display 300, and a safe depth setting 402 can be set by the user. While this embodiment utilizes a slider bar to set the safe depth, other user interfaces may be used in other embodiments. As shown in FIG. 4, the safe depth setting 402 is set to 1 foot. Based on this setting the segments of the navigational routing paths circled at 404 are presented in a normal visual presentation type, e.g., color, line type, hatching, etc., indicating that the depth thereof is deeper than the user set safe depth. However, as shown in FIG. 5, when the safe depth 402' is set to 3 feet, the visual presentation, e.g., color, of the segments circled at 404' are now presented in a different visual presentation, e.g., in the color red, since their depth no longer meets the user selected safe depth criterion as will be discussed below.

In certain embodiments, if the user manually adjusts the safe water depth shallower than that draft of the boat at step 116 of FIG. 1, a warning will be displayed to the user to confirm the manual adjustment. Such is not prohibited in such embodiment because the user may be launching a dingy or other vessel that has a shallower draft and wants to check the status of certain navigational routing paths for use therewith.

Because the navigational routing paths are embedded with depth data, the system is able to compare this depth data with the safe depth information and format the display of the navigational routing paths based thereon. As shown at step 120 of FIG. 1, if the navigational routing path segment depth is greater than or equal to the safe depth, then the standard navigational routing path visual presentation, e.g., color, and depth label are used for that segment at shown at step 122. However, if the navigational routing path depth is less than the safe depth at step 124, then a shallow navigational routing path visual presentation, e.g., color, and depth label are used at step 126 for that segment. This determination is made for all segments of the navigational routing paths so that the user can intelligently select an appropriate navigational routing path based on current depth conditions and their safe depth setting, as opposed to arbitrary display colors that may improperly dissuade or encourage the selection of a particular path based on the user perception of the arbitrary color of the track.

Further, if it is determined at step 128 that the navigational routing path depth is actually above water when adjusted to MLLW, LAT, MIN TIDE, or other tidal datums, i.e., a negative depth, regardless of the safe depth setting, then the above water navigational routing path visual representation, e.g., color, and depth label will be used at step 130 for such segment. Such adjusted display of the navigational routing paths may include a different line style, hatching, color, etc., as well as displaying the associated depths differently than those below water.

Figure 6:
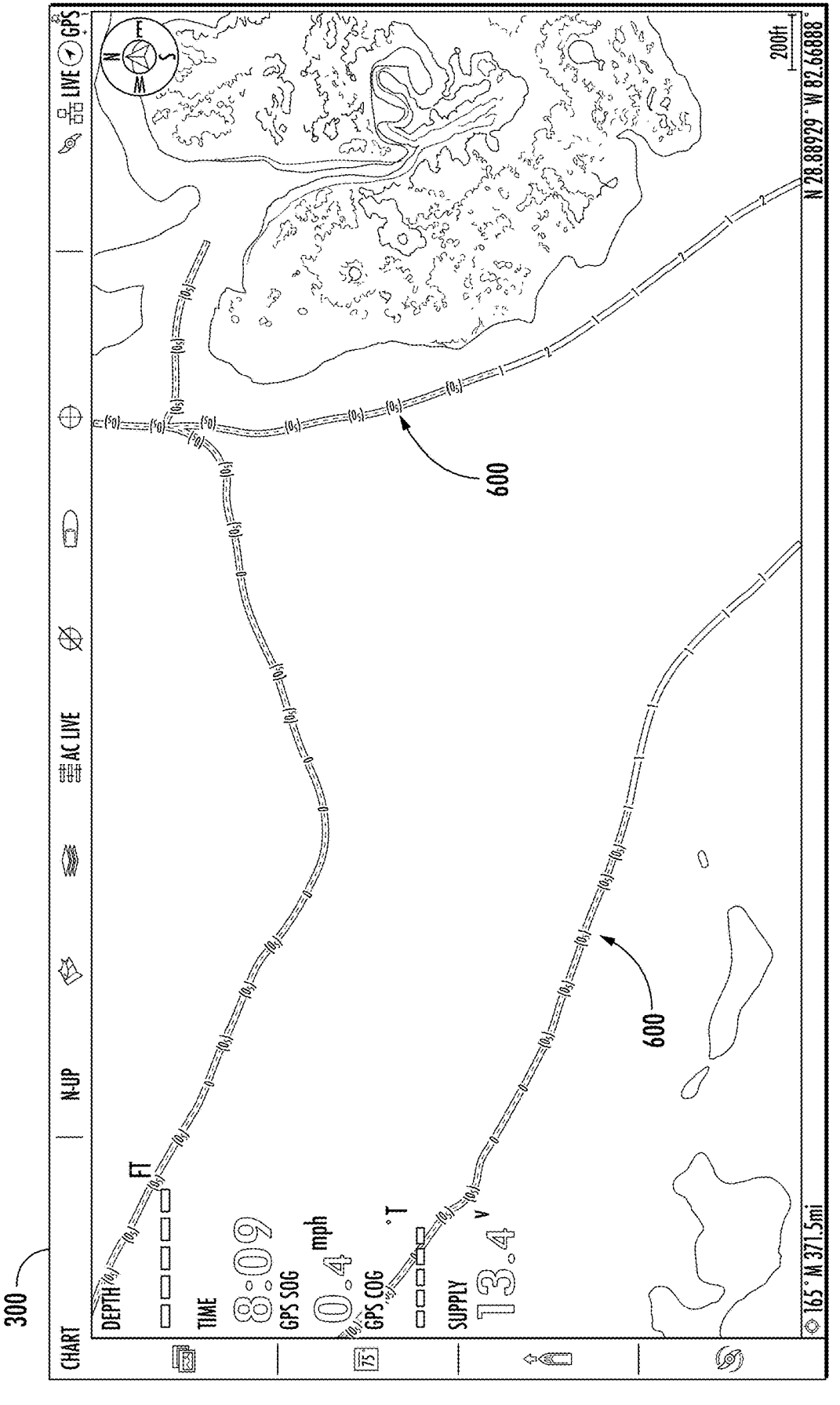
FIG. 6 is a visual representation of navigational routing paths generated by an embodiment of the system of the present invention overlaid on an aerial image marine navigation map on a control head display that are adjusted to the mean lower low water (MLLW), the lowest astronomical tide (LAT), the lowest observed tide (MIN TIDE), or other tidal datums illustrating segments that are then above water or drying at MLLW, LAT, MIN TIDE, or other tidal datums.

FIG. 6 provides an example of the display 300 having segments 600 of the navigational routing paths that are above water (or drying). Specifically, the visual presentation, e.g., color, and line type are different than the segments below water, regardless of whether those navigational routing paths are deeper or shallower than the safe depth. The depth labels for these segments 600 are also different than those for segments below water, and present their information as a negative depth, e.g., "$(0_5)$" (parentheses are used to signify a negative depth since positive numbers are used to signify depth below water).

Returning to FIG. 1, while the navigational routing path depths are automatically adjusted to MLLW, LAT, MIN TIDE, or other tidal datums at step 108 as discussed above, the user is also able to match current tidal conditions by adjusting the water level offset at step 118 as also discussed above. When the water level offset is adjusted, the depths associated with the navigational routing paths adjust as well. When this is the case, the system uses these adjusted navigational routing path depths in steps 120, 124, and 128 to set the visual presentation, e.g., color, of the navigational routing paths and the depth labels in steps 122, 126, 130.

Figure 7:
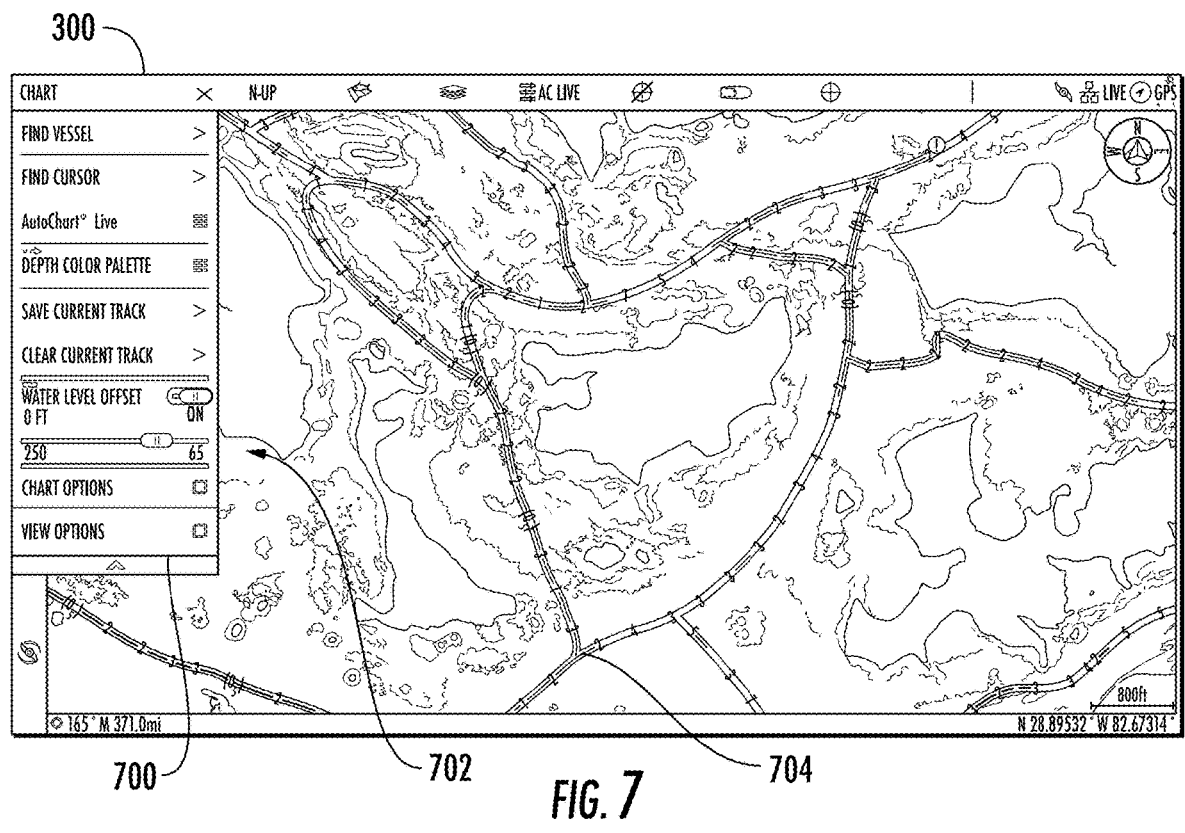
FIG. 7 is a is a visual representation of a user input window generated by an embodiment of the system of the present invention allowing for user input of a water level offset overlaid on an aerial image navigation map having navigational routing paths displayed thereon for a given setting for water level offset.
Figure 8:
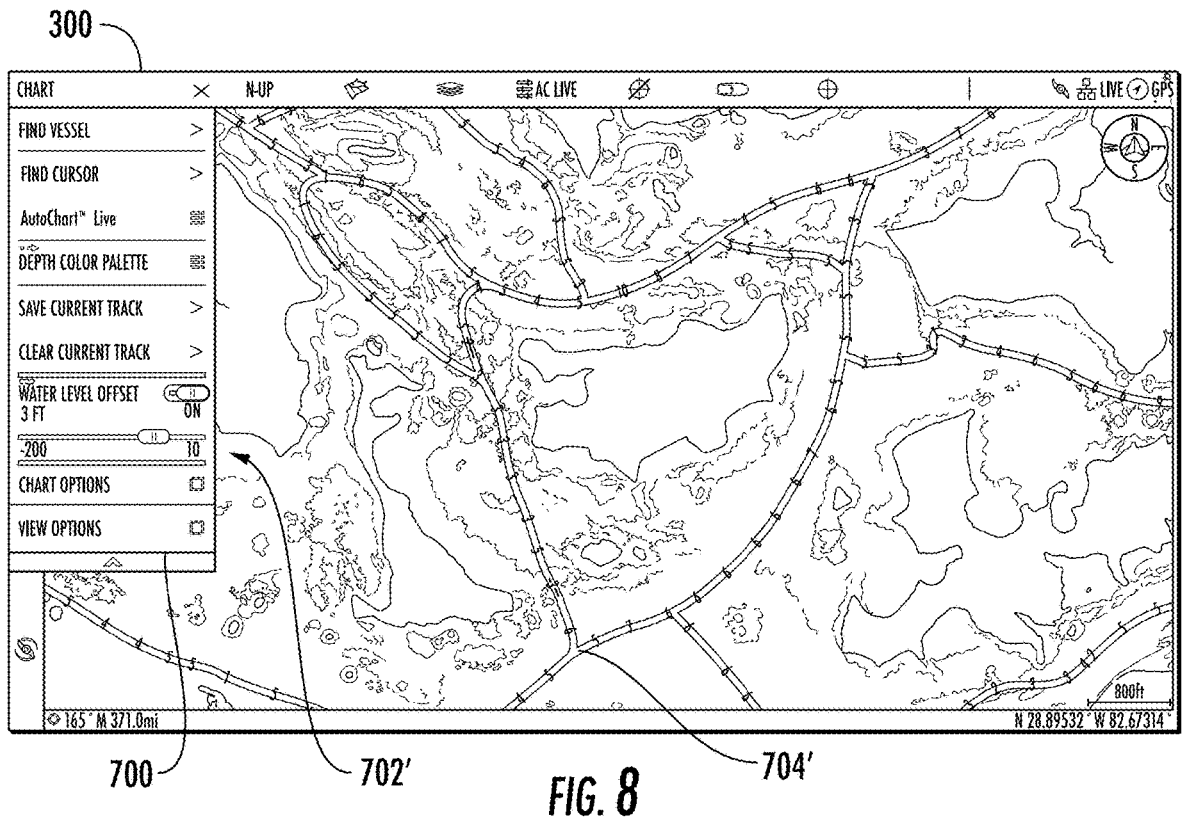
FIG. 8 is a visual representation of a user input window generated by an embodiment of the system of the present invention allowing for user input of a water level offset overlaid on an aerial image navigation map having navigational routing paths displayed thereon illustrating a change in visual display of the navigational routing paths resulting from a change in the user input for the water level offset.

The exemplary displays 300 of FIGS. 7 and 8 illustrate this capability. As shown in FIG. 7, a chart menu 700 provides a water level offset option 702 that may be toggled on/off and allows a user to set an offset value. In this FIG. 7, the water level offset is selected by the user to be 0 feet, which is the default when this option 702 is first toggled on. At this setting, segment 704 of the displayed navigational routing paths uses a different visual presentation, e.g., is colored red, since its depth value is less than the safe depth. However, as may be seen in FIG. 8, when the water level offset 702' is set to 3 feet, the depth labels and visual presentation, e.g., colors, of the segments are adjusted to account for this increase in water level. Segment 704' is now presented in a normal visual presentation, e.g., color, indicating that it is at or deeper than the safe depth, along with its new depth value.

Because of the embedded depth data, depth labels, and ability to adjust based on user's inputs, the navigational routing paths of the present invention are able to provide accurate and easy to understand conditions of the navigational routing paths themselves, giving the user confidence in navigating inshore and nearshore coastal areas.

Figure 2:
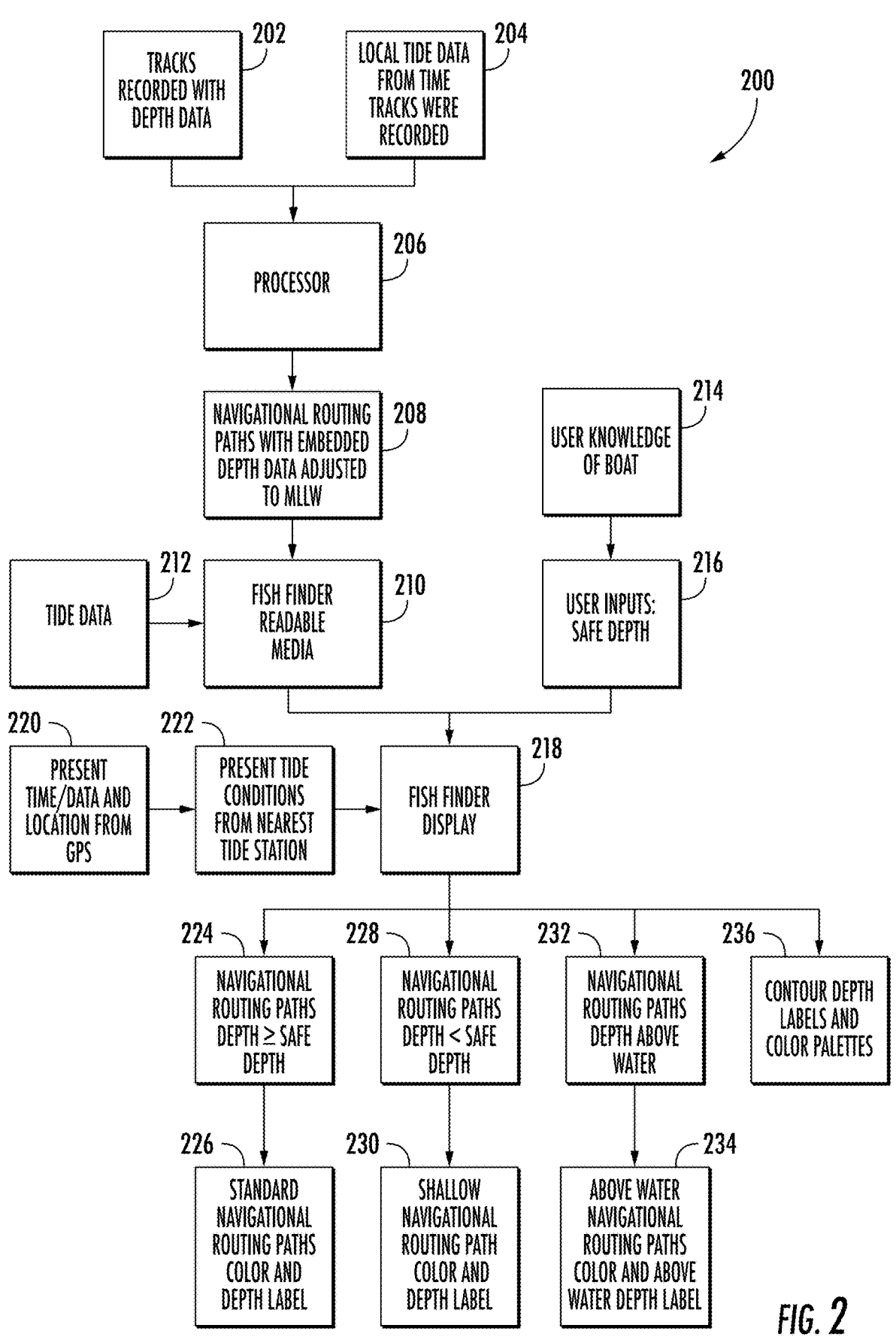
FIG. 2 is a navigational routing path development flow chart for an embodiment of the system of the present invention utilizing automatic adjustment.

While the embodiment discussed above with regard to FIG. 1 provides the ability for a user to vary the water level offset based on observed conditions or other manual adjustments, FIG. 2 illustrates an embodiment 200 that provides automatic adjustment of depth information without requiring the user to input, e.g., an observed or desired water level offset. As will be apparent from a comparison of FIG. 1 and FIG. 2, several of the steps are common between the two, i.e., 102/202, 104/204, 106/206, 108/208, 116/214, 118/216 (absent the manual water level offset), 120/224, 122/226, 124/228, 126/230, 128/232, 130/234, and will not be discussed again in the interest of brevity.

Indeed, certain embodiments include both the manual and automatic adjustments discussed above and below. In such embodiments, the priority between manual and automatic adjustments to the depth level for the navigational routing paths may favor the manual input over the automatic tide data, the automatic tide data over the manual input, or may allow a user to choose the priority globally and/or upon each change to either input.

Specifically with reference to FIG. 2, tide data 212 is included in the fish finder readable media 210. In generating the navigational routing path display on the fish finder at 218, the system determines the present time, date, and location of the boat based on the GPS position at step 220. The system also receives the present tide conditions from the nearest tide station at step 222. This information is used to adjust the depth of segments of the navigational routing paths for display on the fish finder at 218. In other words, this tide data is used to provide real time changes to a navigational routing path's associated depth according to the current tide conditions. This tide data can also be used at step 236 to adjust contour and depth area data in real time on the underlying bathymetric contour map.

Figure 9:
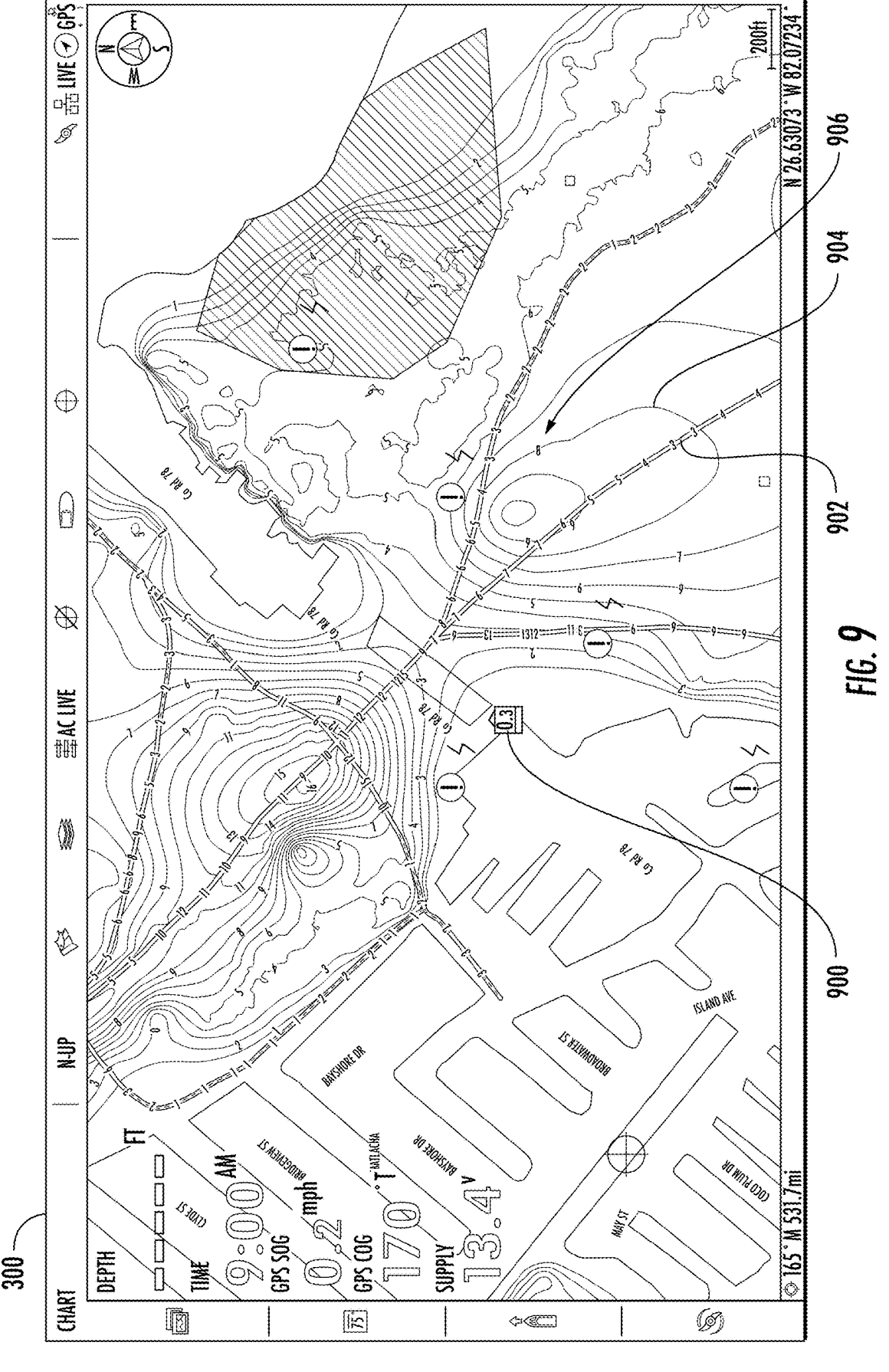
FIG. 9 is a visual representation of navigational routing paths generated by an embodiment of the system of the present invention overlaid on a bathymetric marine navigation map on a control head display including location and current reading for a tide station providing input to an embodiment of the system of the present invention.

As shown in the exemplary display 300 of FIG. 9, the location of the tide station 900 used is included on the navigation map, shown in this embodiment as a bathymetric map. The display of the segments 902 of the navigational routing paths are adjusted based on this local tide data as just discussed. In addition to the adjustment of the segments 902 of the navigational routing paths overlaid on the map, the contour line 904 depth area data 906 are also adjusted on the bathymetric contour map to account for the changing tide information from the tide station 900.

Regardless of the depth adjustment mechanism, the stored navigational routing paths are formed from a collection of segments as discussed above. Each segment in the collection of segments includes a pair of location points, e.g. the start and end points, and the depth encoded as a value in a data field. The storage follows the form of:

```
struct Depth
{
    double Feet;
}
class Location
{
    double Lat;
    double Lon;
}
class NavigationalRoutingPathSegment
{
    Location Start;
    Location End;
    Depth Depth;
}
class NavigationalRoutingPathSegments
{
    Dictionary<Location,
        List<NavigationalRoutingPathSegment>>segments;
}
```

Segments are grouped into connected navigational routing paths that uniquely connect two points by adding them to a dictionary of lists of segments indexed by the start and end points. The navigational routing path is created by following all connected segments where the list contains exactly two items. Dictionary entries where the list contains one item are unconnected end points, and entries where the list contains more than two items are junction points where navigational routing paths meet. A navigational routing path object is then used to process navigational routing paths as individual objects.

```
Class Navigationalroutingpathvertex
{
```

Location Location;
Depth Depth;
}
class NavigationalRoutingPathTrack
{
    List<NavigationalRoutingPathVertex>Vertices;
}

Each segment can be reconstructed by using two adjacent vertices with the depth coming from the first vertex. These navigational routing paths are encoded into a chart product in two ways. First, the complete navigational routing path is encoded into a R-Tree structure to support further processing or display where the complete geometry is required as full resolution. Second, geometry appropriate for display is added to individual "tiles" that are used in the chart file for rendering portions at specific resolutions. The partial geometry may be cropped and/or resampled to reduce processing resources while still preserving sufficient detail. When reducing detail, the shallowest depth value is used for any combined segments. A quad-tree is a typical container for tiles to provide an image pyramid that can represent the cartographic data at various resolutions.

When rendering the navigational routing paths on the fish finder display, the system can display them with various styles that include selectable features for the lines used in various situations. These styles may include one or more of the line thickness, color, dash pattern, text style (font), outline thickness, outline color, outline dash pattern, etc. The system includes an array of these structures that may be accessed by index for use where lines are rendered. This includes, but is not limited to, the various ways to render the segments of the navigational routing paths.

In certain embodiments, there are provided four different line styles indices indicating how to render the navigational routing path lines. The first is "safe," which is used when the depth of the segment is deeper than the specified safety depth. The second is "hazard," which is used when the depth of the segment is at or shallower than the specified safety depth. The third is "drying," which is used when the depth of the segment is at or above the water surface. Finally, the fourth is "unknown," which is used when the depth of the segment is invalid or unknown.

When rendering the lines for navigational routing paths, each segment is evaluated to determine the appropriate style and portions of the track will be rendered in the appropriate style. For maximum consistency where dash patterns are used, adjacent segments of the same style are combined into a single polyline and passed to the actual rendering engine. Text representing the depth at points along the line are created by taking the text style specified for the line style of the enclosing segment and rendering the numeric value based on the current user configuration setting.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer-implemented method for dynamically adjusting navigational routing paths through an inshore and nearshore coastal area within a navigation display in a graphical user interface, the method comprising the steps of:
    displaying a first window containing a marine navigational map within the graphical user interface on a fish finder;
    displaying a navigational routing path overlaid on the first window containing the marine navigational map within the graphical user interface on the fish finder, wherein the navigational routing path includes a plurality of segments embedded with depth data for each of the plurality of segments, the plurality of segments generated by correlating location information for each of the plurality of segments with the depth data, the depth data adjusted to one of a mean lower low water (MLLW), a lowest astronomical tide (LAT), or a Lowest Observed Tide (MIN TIDE);
    receiving tide data, by a processor, for the inshore and nearshore coastal area displayed in the first window;
    automatically generating a display depth by correlating time data with the tide data to generate a local tide influence factor, by a processor, for each of the plurality of segments and adjusting the depth data in view of the local tide influence factor; and
    displaying the display depth overlaid on each respective plurality of segments of the navigational routing path on the first window containing the marine navigational map within the graphical user interface on the fish finder to correspond to a current depth of the segment.

2. The method of claim 1, further comprising the steps of:
    receiving boat draft information;
    determining a safe depth, by a processor, based on the boat draft information; and
    wherein the step of displaying the navigational routing path comprises the steps of:
        displaying each segment that has an associated display depth greater than or equal to the safe depth in a first line style; and displaying each segment that has an associated display depth less than the safe depth in a second line style visually different than the first line style.

3. The method of claim 2, wherein the step of displaying the navigational routing path comprises the step of:

displaying each segment that has an associated display depth that is negative in a third line style that is visually different than the first line style and the second line style.

4. The method of claim 1, wherein the step of receiving tide data, by the processor, for the inshore and nearshore coastal area displayed in the first window comprises the steps of:

displaying a second window overlapping the first window within the graphical user interface on a fish finder, the second window containing a navigation setting user interface;

receiving a water level offset, by the processor, from the navigation setting user interface of the second window overlapping the first window within the graphical user interface on a fish finder;

using the water level offset as the tide data in the step of automatically generating the display depth by the processor.

5. The method of claim 1, wherein the step of receiving tide data, by the processor, for the inshore and nearshore coastal area displayed in the first window comprises the step of receiving tide data, by the processor, for the inshore and nearshore coastal area displayed in the first window transmitted by a tide station.

6. The method of claim 1, wherein the step of receiving tide data, by the processor, for the inshore and nearshore coastal area displayed in the first window comprises the steps of:

receiving high/low information, by the processor, for the inshore and nearshore coastal area displayed in the first window transmitted by a secondary tide station;

determining a present time and location, by the processor, from a global positioning system (GPS) signal;

interpolating a current water height, by the processor, based on the present time and location from the GPS signal and on the high/low information transmitted by the secondary tide station using a sine wave calculation from the National Oceanographic and Atmospheric Administration (NOAA); and using the current water height as the tide data in the step of automatically generating the display depth by the processor.

7. A computer-implemented method for generating dynamically adjustable navigational routing paths through an inshore and nearshore coastal area to be displayed within a navigation display in a graphical user interface, the method comprising the steps of:

recording time and location information from a Global Positioning System (GPS) signal while surveying a navigational routing path through the inshore and nearshore coastal area displayed within a navigation display in a graphical user interface of a fish finder;

recording depth information from a sonar depth sounder while surveying the navigational routing path through the inshore and nearshore coastal area displayed within a navigation display in a graphical user interface of a fish finder;

recording tide data while surveying the navigational routing path through the inshore and nearshore coastal area displayed within a navigation display in a graphical user interface of a fish finder;

correlating the location information with the depth information, by a processor, to generate segments of the navigational routing paths having depth information associated therewith;

correlating the time information with the tide information, by a processor, to generate a local tide influence factor;

adjusting the depth information associated with each of the segments, by a processor, based on the local tide influence factor to generate one of a Mean Lower Low Water (MLLW), a Lowest Astronomical Tide (LAT), or a Lowest Observed Tide (MIN TIDE) adjusted depth; and storing the navigational routing paths, by a processor in a non-transitory fish finder computer readable media, having segments with the MLLW, the LAT, or the MIN TIDE adjusted depth associated therewith.

8. The method of claim 7, further comprising the steps of displaying the navigational routing paths having segments with the MLLW, the LAT, or the MIN TIDE adjusted depth associated therewith through the inshore and nearshore coastal area displayed within the navigation display in the graphical user interface of the fish finder, by the processor, overlaid on the navigation display.

9. The method of claim 8, further comprising the steps of:

receiving current local tide information;

dynamically adjusting, by a processor, the MLLW, the LAT, or the MIN TIDE adjusted depth associated with each of the segments based on the current local tide information to provide current depth information for each segment; and displaying the current depth information of each of the segments of the navigational routing paths, by a processor, on the navigation display in the graphical user interface of the fish finder.

10. The method of claim 9, further comprising the steps of:

receiving boat draft information;

determining a safe depth, by the processor, based on the boat draft information; and wherein the step of displaying the navigational routing path comprises the steps of:

displaying each segment that has an associated current depth information greater than or equal to the safe depth in a first line style; and displaying each segment that has an associated current depth information less than the safe depth in a second line style visually different than the first line style.

11. The method of claim 10, wherein the step of displaying the navigational routing path comprises the step of:

displaying each segment that has an associated current depth information that is negative in a third line style that is visually different than the first line style and the second line style.

12. The method of claim 9, wherein the step of receiving current local tide information comprises the steps of:

displaying a window within the graphical user interface on the fish finder, the window containing a navigation setting user interface;

receiving a water level offset, by the processor, from the navigation setting user interface of the window within the graphical user interface on the fish finder;

using the water level offset as the current local tide information in the step of dynamically adjusting the MLLW, the LAT, or the MIN TIDE adjusted depth associated with each of the segments based on the current local tide information to provide current depth information for each segment.

13. The method of claim 9, wherein the step of receiving current local tide information comprises the step of receiving current local tide information transmitted by a tide station.

14. The method of claim 9, wherein the step of receiving current local tide information comprises the steps of:

receiving high/low information, by the processor, for the inshore and nearshore coastal area transmitted by a secondary tide station;

determining a present time and location, by the processor, from a global positioning system (GPS) signal;

interpolating a current water height, by the processor, based on the present time and location from the GPS signal and on the high/low information transmitted by the secondary tide station using a sine wave calculation from the National Oceanographic and Atmospheric Administration (NOAA); and using the current water height as the current local tide information in the step of dynamically adjusting the MLLW, the LAT, or the MIN TIDE adjusted depth associated with each of the segments based on the current local tide information to provide current depth information for each segment.

* * * * *